United States Patent
Marupaduga et al.

(10) Patent No.: US 11,812,364 B2
(45) Date of Patent: Nov. 7, 2023

(54) METHOD AND SYSTEM FOR DETERMINING COVERAGE ACCESS

(71) Applicant: T-Mobile Innovations LLC, Overland Park, KS (US)

(72) Inventors: Sreekar Marupaduga, Overland Park, KS (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 258 days.

(21) Appl. No.: 17/230,226

(22) Filed: Apr. 14, 2021

(65) Prior Publication Data

US 2022/0338098 A1  Oct. 20, 2022

(51) Int. Cl.
  *H04W 48/02*  (2009.01)
  *H04W 24/08*  (2009.01)
  *H04W 36/08*  (2009.01)
  *H04W 36/24*  (2009.01)

(52) U.S. Cl.
  CPC ........... *H04W 48/02* (2013.01); *H04W 24/08* (2013.01); *H04W 36/08* (2013.01); *H04W 36/24* (2013.01)

(58) Field of Classification Search
  CPC ..... H04W 48/02; H04W 24/08; H04W 36/08; H04W 36/24
  See application file for complete search history.

(56) References Cited

U.S. PATENT DOCUMENTS

| | | | |
|---|---|---|---|
| 10,477,367 B2 | 11/2019 | Blankenship et al. | |
| 10,660,151 B2 | 5/2020 | Futaki | |
| 2013/0122901 A1* | 5/2013 | Chen | H04W 4/08 455/434 |
| 2015/0189673 A1* | 7/2015 | Park | H04W 48/08 370/329 |
| 2017/0339629 A1 | 11/2017 | Lindoff et al. | |
| 2019/0253100 A1 | 8/2019 | Liu et al. | |
| 2020/0252809 A1 | 8/2020 | Patil et al. | |
| 2022/0224449 A1* | 7/2022 | Shrestha | H04L 1/1854 |

OTHER PUBLICATIONS

3GPP; 3GPP TSG-RAN WG2 Meeting#101bis R2-1805946; 2021 (Year: 2021).*
3GPP; 3GPP TSG-RAN WG2 Meeting #113 Electronic R2-2101065; 2021 (Year: 2021).*
EESR in related EP Application No. EP22167660, Aug. 26, 2022.

(Continued)

*Primary Examiner* — Ricky Q Ngo
*Assistant Examiner* — Stephen N Steiner
(74) *Attorney, Agent, or Firm* — Jones Robb, PLLC (57) ABSTRACT

Systems and methods are provided for managing coverage access for wireless devices. A method includes setting a retransmission rate threshold within a wireless network and monitoring a retransmission rate within the wireless network. The method further includes comparing the monitored retransmission rate to the retransmission rate threshold and restricting wireless device access to at least one selected area within the wireless network when the monitored retransmission rate meets the retransmission rate threshold. The area is selected based on signal performance parameters.

18 Claims, 7 Drawing Sheets

(56) References Cited

OTHER PUBLICATIONS

RS-1805946, "Necessity of Supporting CE-Level-Based Access Barring," 3GPP TSG-RAN WG2 Meeting #101 bis, Sanya, China (Apr. 16-20, 2018).
R2-1907119 (Resubmission of R2-1904759), "On Inter-RAT Assistance Information for NB-IoT and LTE(-eMTC)," 3GPP TSG-RAN WG2 Meeting #106, Reno, Nevada, USA (May 13-17, 2019).
Technical Report "Technical Specification Group Services and System Aspects; Release 15 Description; Summary of Rel-15 Work Items," 3GPP TR 21.915 V15.0.0 (Sep. 2019).
R2-2101065, "On Timing and Channel Repetition Impact in LEO," 3GPP TSG-RAN WG2 Meeting #113 Electronic, Elbonia (Jan. 25-Feb. 5, 2021).

* cited by examiner

FIG. 7

METHOD AND SYSTEM FOR DETERMINING COVERAGE ACCESS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5 G RATs (new radio (NR)).

Additionally, in recent years, networks have evolved to connect with the Internet of things (IoT), which describes the network of physical objects or things that are embedded with sensors, software, and other technologies for the purpose of connecting and exchanging data with other devices and systems over the Internet. Cellular IoT is a way of connecting physical things, such as sensors to the internet by having them utilize the same mobile networks as wireless devices. In the consumer market, IoT technology is frequently utilized to equip the "smart home", including devices and appliances such as lighting fixtures, thermostats, home security systems and cameras, and other appliances that support one or more common ecosystems, and can be controlled via devices associated with that ecosystem, such as smartphones and smart speakers. Cellular IoT itself is a rapidly growing ecosystem based on Third Generation Partnership Project (3GPP) global standards, supported by an increasing number of mobile network providers as well as device, chipset, module, and network infrastructure vendors. It improves over other low power wide area (LPWA) network technologies in terms of quality of service (QoS), scalability, and flexibility.

Deployment of evolving RATs in a network provides numerous benefits. For example, newer RATs may provide additional resources to subscribers, faster communication speeds, and other advantages. However, newer technologies may also have limited range and other drawbacks in comparison to existing technologies. To ensure consistent coverage through a wide geographic range, existing technologies are often used in combination with newer technologies. Cellular IoT applications generally use one of two technologies: narrowband (NB)-IoT and Category M1 (Cat-M1), which are both 3 GPP standardized technologies. The technologies address different types of use cases based on their capabilities.

NB-IoT supports devices with very narrow bandwidth, 200 kHz. Due to its narrow bandwidth, the data rate peaks at around 250 kilobits per second (kbps). An NB-IoT carrier can be deployed even in guard-band of an LIE carrier. Common use cases of NB-IoT include utility meters and sensors. NB-IoT provides advantages including low complexity, low cost, ubiquitous coverage, low data rate and low power computing. NB-IoT is particularly suitable for transferring small amounts of information as it uses only a narrow band. With extreme coverage capability, NB-IoT is ideal for supporting very low data rate applications in extremely challenging radio conditions.

Cat-M1 operates at 1.4 MHz bandwidth with higher device complexity/cost than NB-IoT. The wider bandwidth allows to achieve greater data rates (up to 1 Mbps), lower latency and more accurate device positioning capabilities. Cat-M1 supports voice calls and connected mode mobility. Common uses cases for Cat-M1 include connected vehicles, wearable devices, trackers, and alarm panels. Both NB-IoT and Cat-M1 devices can sleep for extended periods of time, which greatly reduces device power consumption.

Certain network operators provide services via multiple RATs simultaneously. For example, a network operator may provide both NB-IoT and Cat-M1 services simultaneously. Devices are accepted and served by the network as either NB-IoT or Cat-M1 devices depending on a device request. Some IoT devices are capable of supporting both NB-IoT and Cat-M1 RATs. If such devices are not allocated with the network capabilities and/or resource usage in mind, large numbers of such devices may introduce inefficiencies, negatively impact device or network performance, and/or otherwise result in a reduced user experience. Thus, there exists a need for systems and methods for leveraging such capability to provide service efficiently; for example, by dynamically changing the device configuration to a particular RAT (such as NB-IoT) without impacting user experience.

Additionally, a method is needed that considers overall network conditions as well as network conditions encompassed by the different technologies in different areas of the network having different signal parameter ranges when assessing coverage access for wireless devices. Thus, a solution is needed for managing coverage access for wireless devices in the environment described above in order to improve overall network performance.

OVERVIEW

Exemplary embodiments described herein include systems, methods, and access nodes for dynamically managing wireless device access to specific areas and technologies. The areas are defined by a signal performance parameter range, e.g., a pathloss range. A method for managing coverage access includes setting a retransmission rate threshold within a wireless network. The method additionally includes monitoring a retransmission rate within the wireless network and comparing the monitored retransmission rate to the retransmission rate threshold. When the monitored retransmission rate meets the retransmission rate threshold, the method further includes restricting wireless device access to at least one selected area within the wireless network.

In a further exemplary embodiment, a method is provided for managing coverage access for wireless devices. The method includes setting a retransmission rate threshold within a wireless network and monitoring a retransmission rate for the wireless network. The method further includes comparing the monitored retransmission rate to the retransmission rate threshold. Additionally, the method includes restricting wireless device access to at least one selected area within the wireless network when the monitored retransmission rate meets the retransmission rate threshold. Further, upon determining that the retransmission rate for the wireless network meets the predetermined threshold, the method includes monitoring multiple retransmission rates for different RATs within the wireless network and comparing the retransmission rates for the different RATs. The method further includes assigning wireless devices to a RAT with a lower retransmission rate.

In yet a further exemplary embodiment, a system is provided for managing coverage access within a wireless network. The system includes an access node including at least one processor programmed to perform multiple steps. The steps include setting a retransmission rate threshold within a wireless network and monitoring a retransmission rate within the wireless network. The steps further include comparing the monitored retransmission rate to the retransmission rate threshold and restricting wireless device access to at least one selected area within the wireless network when the monitored retransmission rate meets the retransmission rate threshold.

In embodiments set forth herein, areas with particular signal performance parameter ranges may correspond to the selected area. Furthermore, particular signal performance parameters may include reference signal received power (RSRP) and/or pathloss.

DETAILED DESCRIPTION

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Because certain network conditions are likely to result in poor performance of wireless devices in the network and further to deplete network resources, embodiments provided herein dynamically manage UE access from one or more selected locations with specific network conditions based on a predetermined retransmission rate threshold. The management may be dynamically performed based on monitoring at least one retransmission rate within the network and comparing it to a predetermined threshold. By dynamically managing coverage access for wireless devices, embodiments set forth herein improve resource utilization, load balancing, battery savings, and QoS parameters.

Embodiments as set forth herein consider a retransmission rate in a sector by measuring block error rate (BLER). BLER is defined by 3GPP as the ratio of the number of erroneous blocks to the total number of received. The calculation is based on a cyclic redundancy check (CRC) evaluation which is used for inspection of transport blocks at the receiver side. The CRC is attached to each transport block upon sending by the transmitter and at the destination the transport block is cross checked by the receiver. The transport block is successfully decoded if the attached CRC matches the CRC calculated by the receiver. The retransmission rate may be evaluated for an entire sector and/or for portions of a sector defined based on performance parameters. Additionally, the retransmission rate may be evaluated separately for different RATs, such as Cat-M1 and NB-IoT.

Thus, various aspects of the present disclosure may operate in an IoT cellular network utilizing multiple RATs, such as NB-IoT and Cat-M1. By providing a system and method to dynamically assign a RAT to IoT devices which support both NB-IoT and Cat-M1 (e.g., based on retransmission rate), the present disclosure may improve the overall service delay for IoT devices, may improve the battery usage parameters of an NB-IoT device, improve overall cell resource utilization, and so on.

Both Cat M1 and NB-IoT utilize a concept called coverage enhancement (CE) levels. These CE levels may be configured, for example, based on pathloss ranges experienced by devices in the impacted areas. Typically, three CE levels are configured including a lowest CE level 0, an intermediate CE level 1, and a highest CE level 2. UEs connected in higher CE levels can consume more resources then UEs in lower CE levels and have a negative impact on network QoS. The selected area may correspond to one or more CE levels. Thus, an area where pathloss is highest and RSRP is the lowest may correspond to a highest CE level and an area where pathloss is lowest and RSRP is the highest may correspond to a lowest CE level.

In embodiments set forth herein, both Cat M1 and NB-IoT devices as well as hybrid devices capable of utilizing both technologies may operate within a cell simultaneously. Different network conditions may exist for the different technologies as well as for the different CE levels. With Cat-M1 and NB-IoT RATs, CE levels are defined based on performances parameters such as pathloss and thus, the portions of the sector considered herein may correspond to CE levels. Thus, in embodiments set forth herein, a method evaluates retransmission rates for selected areas characterized by a range of performance parameters as well as retransmission rates for particular technologies.

Wireless device access to the selected region or area and particular technologies may be managed based on the monitored retransmission rate and a pre-determined retransmission rate threshold. For example, when a measured retransmission rate in a sector meets a predetermined retransmission rate threshold, the method may restrict wireless device access from a particular selected region of the sector characterized by a predetermined range of performance parameters. Additionally, embodiments set forth herein may direct wireless devices to a particular RAT based on the measured retransmission rate in one RAT exceeding a retransmission rate in another rate. For example, the use of NB-IoT devices in areas with high pathloss, such as the CE level 2 area, may have a high impact on BLER. Thus, in embodiments set forth herein, devices in areas of high pathloss may be re-directed from NB-IoT to Cat-M1. The reverse scenario is also possible. The selected area may correspond to one or more CE levels.

In further embodiments set forth herein, when the measured retransmission rate meets the predetermined threshold, IoT wireless devices in selected regions, e.g., high pathloss regions or CE level 2 regions, may be ordered to connect to an access node for a neighboring sector. Accordingly, the wireless device may be either a dual capable device or a device capable of a single RAT, such as NB-IoT or Cat-M1 and may be subject to a handover from one sector to another sector to another neighboring sector when the threshold is met. The method may apply to devices requesting to connect, while devices already receiving service may continue receiving service from their current location regardless of whether the threshold is met.

An increase in BLER may have multiple causes, such as for example, fading or RSRP saturation that impacts link stability. The increase may be greater at the cell edge, i.e., the area immediately bordering the coverage boundary of the access node, than in locations closer to the access node. A typical BLER target is 10%, which means the receiver should receive at least 90% successful transmission. If the target is less than 10%, such as for example, 5%, then more retransmission might be required and cause radio resource consumption. These target values could be defined dynamically by the network operator based on loading conditions. A threshold BLER or retransmission rate may be set at a higher value than the target value, such as for example, 30%, 40%, or 50%.

Accordingly, embodiments as set forth herein avoid increasing retransmission of data and thus achieve battery savings. Furthermore, by refusing connections for devices in selected areas and directing devices to utilize particular technologies, more network resources are available for wireless devices entering the sector in more desirable areas with less pathloss or fading.

Exemplary embodiments described herein include systems and methods for dynamically restricting UEs in particular selected locations from connecting to an access node based on comparison between a monitored retransmission rate and a retransmission rate threshold. The threshold may be defined as 15%, 25%, 35%, 45%, 55% or other value. When the monitored retransmission rate meets the threshold, UEs in the pre-selected area are prohibited from connecting.

Further, in embodiments as set forth herein retransmission rates may be measured for multiple RATs. For example, retransmission rates may be measured and compared for both an NB-IoT RAT and a Cat-M1 RAT. These measurements may take place when the measured retransmission rate for the sector meets the predetermined threshold. Accordingly, devices in a pre-selected area may be prohibited from connecting and further, hybrid devices may be assigned to the RAT having the lower retransmission rate. Further, in some instances, devices entering the preselected area may be handed over to a neighboring sector.

In embodiments set forth herein, the preselected area is defined within the network in which UE access may be dynamically restricted. For example, multiple areas may be defined based on a path loss range in each area. The areas may alternatively be defined based on RSRP. In further embodiments, the areas may be defined by both pathloss and RSRP or by other signal performance parameters. An area in close proximity to an access node typically experiences less path loss and higher RSRP than areas further from the access node. Multiple areas having different path loss ranges and/or RSRP ranges may be defined within a coverage area of an access node. In embodiments set forth herein, the specific areas may correspond to CE levels. For example, a first CE level closest to the access node has a first pathloss range and RSRP range and may be CE Level 0, a second CE level further from the access node has a second pathloss range and RSRP range and may be CE Level 1, and a third CE level bordering the coverage area edge of the access node has a third pathloss range and RSRP range and may be CE Level 2.

Additionally, in accordance with embodiments set forth herein, at least one retransmission rate threshold is defined within the network. The retransmission rate threshold may be for an entire sector or may be for one or more of the preselected areas in the sector. The access node may dynamically restrict UEs in at least one higher order CE level from connecting when a measured retransmission rate meets the predetermined retransmission rate threshold. The predetermined area may, for example, be an area located nearest to the edge of the coverage area of the access node. Accordingly, any UEs in the predefined area requesting connection to the access node may be denied access. Additionally, in embodiments set forth herein, the access node continues to service UEs already connected prior to the threshold determination regardless of the location of the already connected UEs.

Thus, embodiments disclosed herein may operate in an IoT cellular network utilizing technologies offering CE levels, such as NB-IoT and Cat M1. Through embodiments set forth herein, multiple objectives can be achieved. For example, reverse noise rise at the access node can be reduced. Additionally, service parameters to already connected UEs are improved and service delay is decreased. Furthermore, battery savings are achieved for already connected UEs and efficient resource utilization is optimized within the network.

Therefore, in accordance with embodiments disclosed herein, methods and systems identify at least one retransmission rate threshold within the network and monitor at least one existing retransmission rate to determine if the threshold is met. Methods and systems identified herein dynamically restrict wireless device access from one or more particular predefined areas based on this determination in order to enhance performance.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as sensors that may be connected to a network as an IoT device.

The term "path loss" in data communication may refer to the reduction in power density of an electromagnetic wave as it propagates through space. Path loss may be due to many effects, including, for example, refraction, diffraction, reflection, and absorption. Path loss may be impacted by environmental factors and terrain contours, the distance between the transmitter and the receiver, and the height and location of antennas.

An exemplary system described herein includes at least an access node (or base station), such as an evolved nodeB (eNodeB), a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of dynamically restricting wireless device access based on monitored retransmission rate may be implemented as computer-readable instructions or methods, and processing nodes on the network for executing the instructions or methods. The processing node may include a processor included in the access node or a processor included in any controller node in the wireless network that is coupled to the access node.

Embodiments disclosed herein operate in a network supporting NB-IoT, which is configured for a high volume of low-complexity devices. NB-IoT can effectively serve devices in challenging radio environments such as deep building or underground radio signal penetration. UEs can be specifically configured with a chipset supporting NB-IoT. Further, embodiments disclosed herein operate in a network supporting Cat-M1\41, which is also supported by devices having a particular chipset. Cat-M1 supports lower data-rate applications and is appropriate for low-power sensing and monitoring devices such as health and fitness wearables, utility meters, and vending machines, tracking, and other applications. Cat-M1 offers a lower bandwidth than most cellular services, although higher than NB-IoT applications. Wireless devices in the network may also be hybrid devices, which support both NB-IoT and Cat-M1 technologies.

Figure 1:
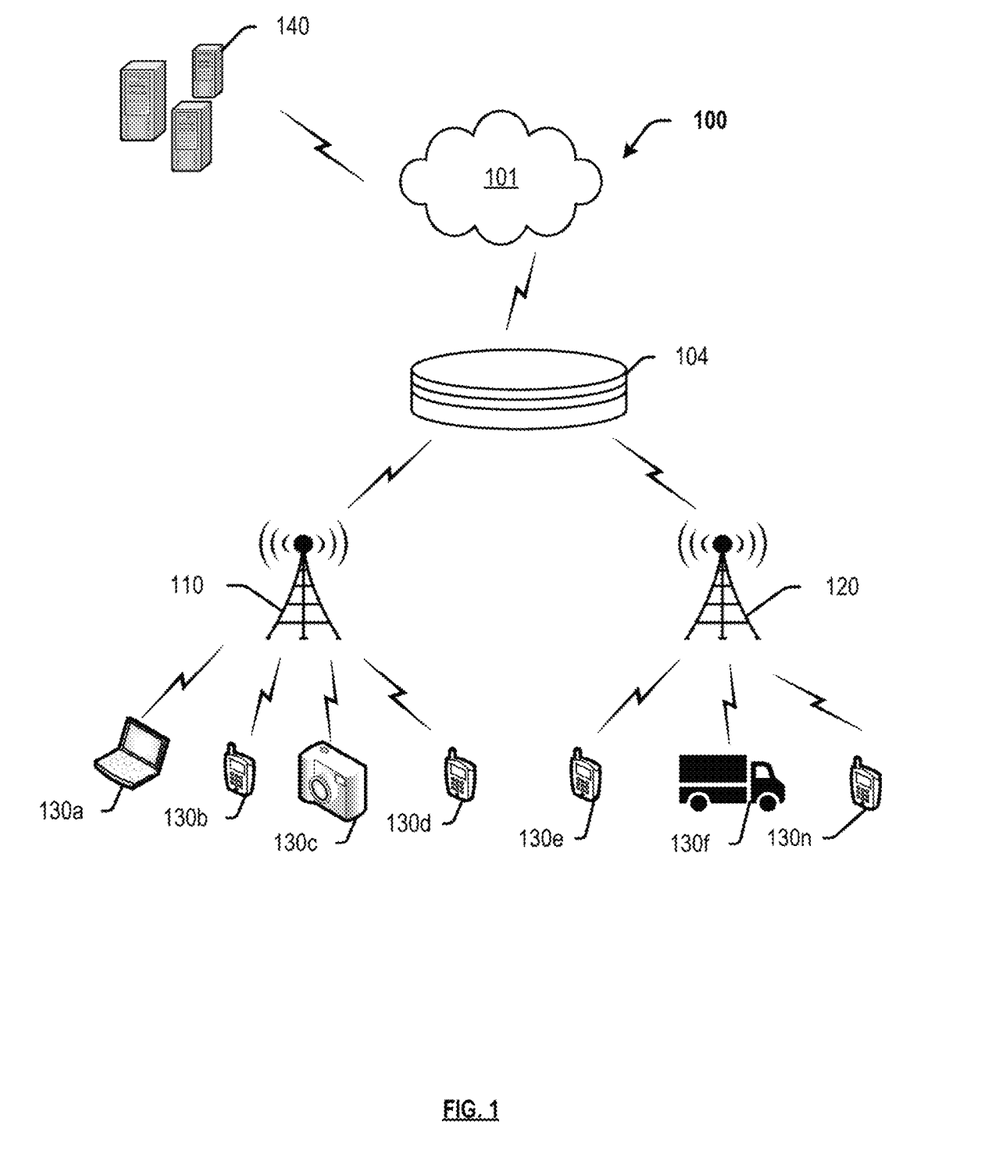
FIG. 1 depicts an exemplary system for wireless communication, in accordance with the disclosed embodiments.

FIG. 1 depicts an exemplary system 100 for use in conjunction with embodiments disclosed herein. The system 100 may include an IoT cloud platform 101, a core network 104, one or more IoT base stations or access nodes 110, 120, and multiple IoT terminals, devices, or UEs 130a . . . n. Other computing systems and devices 140 may be connected to the IoT platform 101 in order to control and/or monitor the multiple IoT terminals 130a . . . n.

The IoT cloud platform 101 may perform processing and forward results to computing systems and devices 140 and/or IoT connected devices 130a . . . n. The IoT core network 104 connects with the cloud platform 101 and the one or more IoT base stations or access nodes 110, 120. Characteristics of the IoT base stations 110, 120 are further described below with respect to FIG. 2.

The IoT devices 130a . . . n are devices configured with appropriate technologies for connecting to the IoT cloud platform 101. The IoT devices 130a . . . n may be or include smart phones and may also include low-complexity devices designed to communicate infrequently. For example, connected devices 130a . . . n may include low-cost sensors, meters, wearables, and trackers. Many of these devices 130a . . . n can be deployed in challenging radio environments, such as a basement of a building or on a moving piece of machinery. In some instances, the devices 130a . . . n may send occasional signals for several years without a change of battery. The IoT core network 104 can collect and analyze data from the connected devices 130a . . . n sensors for real-time monitoring, GPS tracking, mobile route tracking, power usage monitoring, etc.

In embodiments set forth herein, the base stations 110, 120 and the connected devices 130a . . . n may be configured to operate using NB-IoT and/or Cat-M1 technologies. NB-IoT supports ultra-low complexity devices with a narrow bandwidth of 200 kHz. Due to its narrow bandwidth, the data rate peaks at around 250 kbps. An NB-IoT carrier can be deployed in three ways including (1) stand-alone; (2) guard-band; and (3) in-band. The stand-alone mode allows deployment in a dedicated spectrum. The guard-band deployment occurs using the guard band of an LTE carrier, thereby enabling use of a spectrum that is otherwise unused. In-band operation allows NB-IoT to operate using one physical resource block (PRB) of an LTE carrier.

Cat-M1 operates at 1.4 MHz bandwidth and typically Cat M1 devices have a higher complexity and cost than NB-IoT devices. The wider bandwidth allows Cat-M1 to achieve greater data rates and lower latency, with more accurate device positioning capabilities. In-band operation for Cat-M1 may be implemented using six PRBs of an LTE carrier. Where a device (such as any of wireless devices 130a . . . n) is capable of operation in both NB-IoT and Cat-M1, it may be referred to as a "dual-capable" or "dual-capability" device. Dual capability may be provided by equipping the device with a chipset designed to utilize both NB-IoT and Cat-M1 RATs.

Both NB-IoT and Cat-M1 devices can sleep for extended periods of time with extended Discontinuous Reception (eDRX) and Power Saving Mode (PSM) functionalities, which greatly reduces device power consumption. Furthermore, both technologies support enhanced signal coverage per base station. With extreme coverage capability, NB-IoT is ideal for supporting very low data rate applications in extremely challenging radio conditions. Devices, such as the devices 130a . . . n may be equipped with a particular chipset designed to utilize NB-IoT or Cat M1 technology.

NB-IoT and Cat-M1 technologies offer coverage extension beyond existing cellular technologies. Reliable coverage enhancement is achieved by the repeated transmission of data and control signaling. Each transmission can be configured to repeat for a designated number of times in order to achieve higher success opportunities at the defined coverage level. When path loss at the desired coverage area is high, a greater number of repetitions can be configured. The network can configure up to three coverage enhancement (CE) levels (CE0, CE1, CE2) to serve the connected devices 130a . . . n. Thus, in the different CE levels, a message may be repeated a different number of times. If the device resides in a CE level with lower path loss and higher RSRP, the signal is repeated fewer times than when the device is located in area with higher path loss and lower RSRP. The CE levels aim to ensure that a good signal quality is received in all locations.

Figure 2:
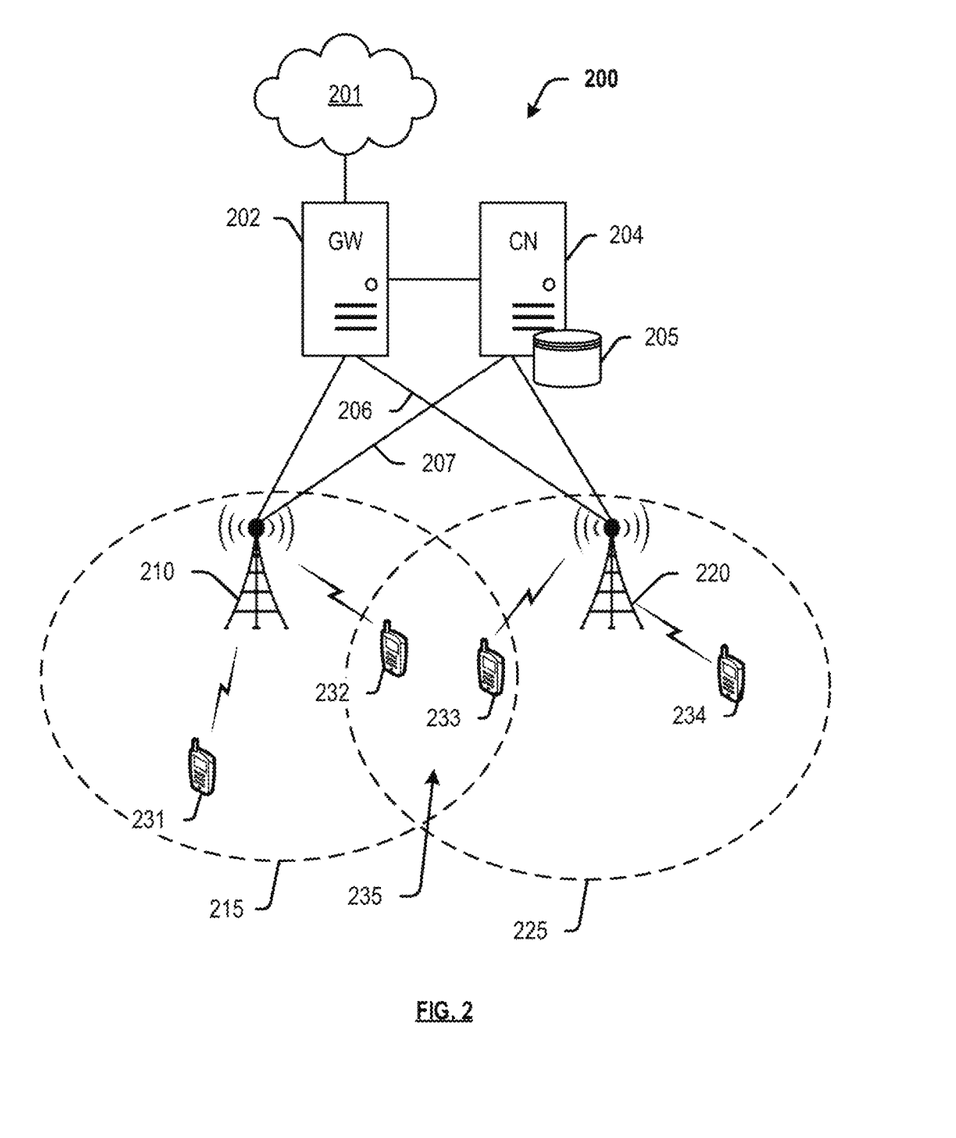
FIG. 2 illustrates an exemplary configuration of a system for wireless communication in accordance with the disclosed embodiments.

FIG. 2 depicts an exemplary system 200 for use in conjunction with embodiments disclosed herein. System 200 comprises a communication network 201, gateway 202, controller node 204, access nodes 210 and 220, and wireless devices 231, 232, 233, and 234. Access node 210 is illustrated as having a coverage area 215. Thus, access node 210 is configured to deploy radio air interfaces within the first coverage area 215. In embodiments disclosed herein, the access node 210 may deploy multiple radio air interfaces utilizing different RATs, different frequency bands, and over different coverage areas.

Access node 220 is illustrated as having a coverage area 225 overlapping with the coverage area 215 of the access node 210. Thus, access node 220 deploys a radio air interface within the coverage area 225. In embodiments disclosed herein, the access node 220 may deploy multiple radio air interfaces using different RATs, such as, for example, NB-IoT, Cat M1, 4G, and 5G, different frequency bands, and different coverage areas.

As shown herein, wireless devices 231, 232 attach to access node 210 and wireless devices 233, 234 attach to access node 220. Although access nodes 210, 220 and wireless devices 231, 232, 233, 234 are illustrated in FIG. 2, any number of access nodes and wireless devices can be implemented within system 200.

Wireless devices 231, 232 are located within coverage area 215 and access network services from access node 210. Wireless device 233 and 234 are located within coverage area 225 and access network services from access node 220. Further, wireless devices 232 and 233 are located within potential interference area 235 formed by an overlap of coverage areas 215 and 225. For example, access nodes 210, 220 may be configured to deploy individual sectors and potential interference area 235 may comprise any overlapping coverage area of the sectors and may be located at or near an edge of coverage area in an area of high pathloss and in a high CE level, e.g., CE level 2. In accordance with embodiments set forth herein, the access node 210 may monitor retransmission rates in the network associated with the wireless devices 231-234 and may dynamically restrict access to the area 235 and other areas having similar signal performance parameters when a monitored retransmission rate in the sector meets a predetermined threshold.

Further, a scheduling entity (within, for example, one or both of access nodes 210, 220, or controller node 204) may be configured to allocate resources to improve overall network resource utilization and performance, for example by restricting access to high path loss area 235. For example, if wireless devices 231 and 232 are using NB-IoT and the retransmission rate for NB-IoT is higher than the retransmission rate for Cat-M1, the scheduling entity may restrict access to NB-IoT for the wireless device 233. In embodiments disclosed herein, one or more of access nodes 210, 220 may comprise logic for performing operations for evaluating whether the monitored retransmission rate meets a predetermined threshold, for determining areas of high path loss such as potential interference area 235 between coverage areas 215 and 225, and for comparing retransmission rates of multiple RATs.

While the potential interference area 235 is shown as an exemplary undesirable area experiencing high path loss, other types of undesirable areas are within the scope of the disclosure. For example, in addition to areas of overlapping coverage, undesirable areas may include areas with high interference or areas with a weak signal, such as a cell edge, which may be defined as an area within a predetermined distance from the edge of a coverage area.

Access nodes 210, 220 can be any network node configured to provide communication between wireless devices 231-234 and communication network 201, including standard access nodes and/or short range, low power, small access nodes. For instance, access nodes 210, 220 may include any standard access node, such as a macrocell access node, base transceiver station, a radio base station, next generation NodeBs (gNBs) in 5G networks, or enhanced eNodeBs (eNBs) in 4G/LTE networks, or the like. Access nodes such as gNBs may include any combination of centralized units (CUs), distributed units (DUs), and radio units (RUs). In an exemplary embodiment, a macrocell access node can have a coverage area 215, 225 in the range of approximately five kilometers to thirty five kilometers and an output power in the tens of watts. In other embodiments, access nodes 210, 220 can be a small access node including a microcell access node, a picocell access node, a femtocell access node, or the like such as a home NodeB or a home eNodeB device. Moreover, it is noted that while access nodes 210, 220 are illustrated in FIG. 2, any number of access nodes can be implemented within system 200.

Access nodes 210, 220 can comprise processors and associated circuitry to execute or direct the execution of computer-readable instructions to perform operations such as those further described herein. Briefly, access nodes 210, 220 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 210, 220 can receive instructions and other input at a user interface. Access nodes 210, 220 communicate with gateway node 202 and controller node 204 via communication links 206, 207. Access nodes 210, 220 may communicate with each other and with other access nodes (not shown) using a direct link such as an X2 link or similar.

Wireless devices 231-234 may be any device, system, combination of devices, or other such communication platform capable of communicating wirelessly with access nodes 210, 220 using one or more frequency bands deployed therefrom, such as for example, a band dedicated to NB-IoT technology. Wireless devices 231-234 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 210, 220. As set forth above, the wireless devices can be sensors, meters, or other IoT devices. Other types of communication platforms are possible.

Communication network 201 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 201 can be capable of carrying data, for example, to support voice, push-to-talk, broadcast video, and data communications by wireless devices 231-234. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 201 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 201 can also comprise additional base stations, controller nodes, telephony switches, internet routers, network gateways, computer systems, communication links, or some other type of communication equipment, and combinations thereof.

Communication links 206, 207 can use various communication media, such as air, space, metal, optical fiber, or some other signal propagation path, including combinations thereof. Communication links 206, 207 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 206, 207 may include Si communication links. Other wireless protocols can also be used. Communication links 206, 207 can be a direct link or might include various equipment, intermediate components, systems, and networks. Communication links 206, 207 may comprise many different signals sharing the same link.

Gateway node 202 can be any network node configured to interface with other network nodes using various protocols. Gateway node 202 can communicate user data over system 200. Gateway node 202 can be a standalone computing device, computing system, or network component, and can be accessible, for example, by a wired or wireless connection, or through an indirect connection such as through a computer network or communication network. For example, gateway node 202 can include a serving gateway (SGW) and/or a public data network gateway (PGW), etc. One of ordinary skill in the art would recognize that gateway node 202 is not limited to any specific technology architecture, such as Long Term Evolution (LTE) or 5G NR can be used with any network architecture and/or protocol.

Gateway node 202 can comprise a processor and associated circuitry to execute or direct the execution of computer-readable instructions to obtain information. Gateway node 202 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 202 can receive instructions and other input at a user interface.

Controller node 204 can be any network node configured to communicate information and/or control information over system 200. Controller node 204 can be configured to transmit control information associated with retransmission rate thresholds. Controller node 204 can be a standalone computing device, computing system, or network component, and can be accessible, for example, by a wired or wireless connection, or through an indirect connection such as through a computer network or communication network. For example, controller node 204 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 204 is not limited to any specific technology architecture, such as Long Term Evolution (LTE) or 5G NR can be used with any network architecture and/or protocol.

Controller node 204 can comprise a processor and associated circuitry to execute or direct the execution of computer-readable instructions to obtain information. Controller node 204 can retrieve and execute software from storage, which can include a disk drive, a flash drive, memory circuitry, or some other memory device, and which can be local or remotely accessible. In an exemplary embodiment, controller node 204 includes a database 205 for storing information, such as coordinates of pre-defined areas based on path loss characteristics and pre-determined retransmission rate thresholds utilized for dynamically restricting device access to the predefined areas including potential interference area 235, as well as positions and characteristics of wireless devices 231-234. The database may further store handover thresholds, scheduling schemes and resource allocations for each of access nodes 210, 220 and wireless devices connected thereto, and so on. This information may be requested by or shared with access nodes 210, 220 via communication links 206, 207, X2 connections, and so on. The software comprises computer programs, firmware, or some other form of machine-readable instructions, and may include an operating system, utilities, drivers, network interfaces, applications, or some other type of software, and combinations thereof. Controller node 204 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 210, 220 and communication network 201.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 200 may be, comprise, or include computers systems and/or processing nodes, including access nodes, controller nodes, and gateway nodes described herein.

Figure 3:
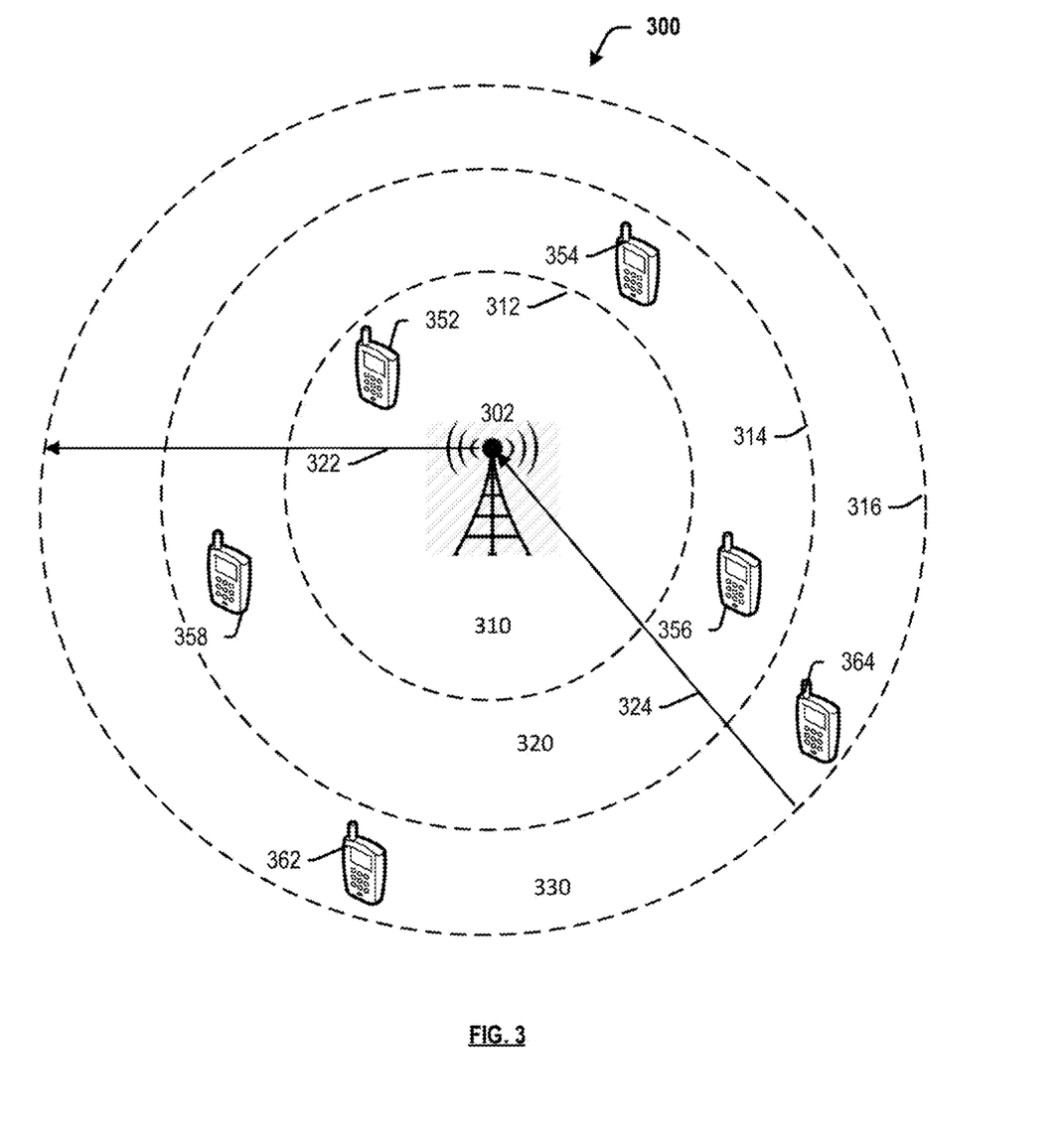
FIG. 3 depicts areas within a network having different signal performance parameter ranges in accordance with disclosed embodiments.

FIG. 3 depicts an exemplary environment 300 for embodiments set forth herein. A single access node 302 may deploy one or more RATs. Various areas may be predefined as coverage areas of the access node 302. A first area 310 may be defined between the access node 302 and a boundary 312. A second area 320 may be defined between boundaries 312 and 314, and a third area 330 may be defined between boundary 314 and boundary 316. Boundary 316 may correspond with an edge of a coverage area of access node 302. As explained above, signal parameters may vary between the access node 302 and the cell edge. For example, as shown by arrow 322, path loss may increase moving from area 310 to area 320 and to area 330, which may be areas further from the access node, but may also be areas that are not further from the access node, but instead may be areas confronted with environment or geographical signal barriers. As shown by arrow 324, RSRP and/or signal to noise plus interference (SINR) or carrier to interference plus noise ratio (CINR) may decrease with distance from area 310 to area 320 and from area 320 to area 330. This may be due to distance from the access node or based on other factors such as geographical or environment factors impacting signal performance. Thus, the boundaries 312, 314, and 316 may be selected based on the signal parameters, such as path loss, RSRP, SINR, and/or CINR.

In technologies deployed by the access node 302 such as NB-IoT and Cat M1, a CE feature may be provided. A base level (CE level 0) 310 and two coverage extension levels, CE level 1 320 and CE level 2 330 may be provided. Logic provided in the network may choose the areas for the CE levels based on signal conditions, such as RSRP, CINR, SINR, and/or path loss. In the CE areas CE level 1 and CE level 2, coverage is improved by increasing a number of repetitions in the uplink and downlink. Reliable coverage enhancement is achieved by the repeated transmission of data and control signaling. Each transmission can be configured to repeat for a designated number of times in order to achieve higher success opportunities at the desired coverage level. Thus, transmissions in CE level 2 330 may be configured to be repeated a greater number of times than transmissions in CE level 1 320. Likewise, transmission is CE level 1 320 may be configured to be repeated a greater number of times than transmissions in CE level 0 310. When path loss at the desired coverage is high or RSRP, CINR, or SINR is low relative to other regions within the coverage area, a greater number of repetitions can be configured.

Although the CE levels and predefined areas are illustrated as being a particular distance from the access node, it should be noted that the areas are selected based on signal parameters and therefore are not necessarily proportionately distant from the access node 302. For example, in outdoor areas, outside of buildings, coverage extension may not be required as signal parameters may be strong. In indoor spaces, areas above ground may not require coverage extensions, but areas underground will likely require a coverage extension. For example, CE level 0 might be located outside, CE level 1 might be located on an upper floor of a building, and CE level 2 might be located in a basement of a building. More energy is required to transmit signals in coverage extension areas. More repetitions and a longer round trip time between sending and receiving are also generally required in coverage extension areas.

In operation, UE 352 may be operating within area 310, UEs 354, 356, and 358 may operate within area 320, and UEs 362 and 364 may operate within area 330. The UEs may be connected to the access node 302, using a particular technology, for example NB-IoT technology. A processor within the access node 302 or other processor in the system may monitor a retransmission rate for the access node based on communications with all of the UEs connected to the access node 302. The processor alternatively or additionally may monitor a retransmission rate for each RAT utilized by the access node. The access node 302 may further set a retransmission rate threshold for example, a BLER of 45%. If the access node 302 determines that the retransmission rate threshold is met, device access to a particular area, such as area 330 may be restricted. Specifically, the access node 302 may restrict any further connections from UEs in area 330, which may be CE level 2. While the access node may continue to serve the connected UEs and accept connection requests from UEs in areas 310 and 320, it will dynamically restrict access to area 330 as long as the monitored retransmission rate meets the retransmission rate threshold.

Additionally, the processor of access node 302 may measure and monitor retransmission rates for specific technologies. For example, the processor may measure retransmission rates fix NB-IoT and Cat-M1 technologies. The processor may compare the retransmission rates to determine which is lower. The processor may further determine whether UEs are hybrid or dual capable UEs, for example, based on a UE capability report transmitted by the UE. When a UE is a dual capable UE and the retransmission rate meets the threshold, the processor nay assign the UE to the RAT having the lower retransmission RAT. This process may be performed dynamically, and monitoring may be continuous, so that when the threshold is no longer met, the access node will connect with UEs in all of areas 310, 320, and 330 and further the UEs, will be permitted to connect to any available RAT regardless of the retransmission rate for the particular RAT.

Figure 4:
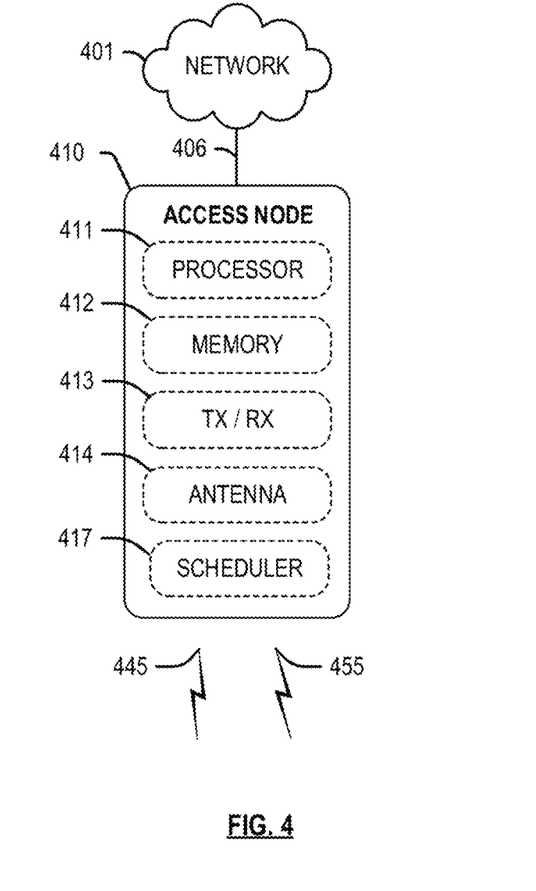
FIG. 4 depicts an access node in accordance with the disclosed embodiments.

FIG. 4 depicts an exemplary access node 410. Access node 410 may comprise, for example, a macro-cell access node, such as access node 410 described with reference to FIG. 1. Access node 410 may be connected to a network 401 using communication link 406. Access node 410 is illustrated as comprising a processor 411, memory 412, transceiver 413, antenna 414, and scheduler 417. Processor 411 executes instructions stored on memory 412, while transceiver 413 and antenna 414 enable wireless communication with other network nodes, such as wireless devices and other nodes. For example, access node 410 may be configured to detect wireless devices located in different predefined areas and monitor retransmission rates for the network. The access node 410 may further be configured to dynamically restrict access to one or more of the predefined areas based on a comparison of the monitored retransmission rate with a retransmission rate threshold. Scheduler 417 may be provided for scheduling resources based on the presence of the wireless devices. These features may be enabled by access node 410 comprising two co-located cells, or antenna/transceiver combinations that are mounted on the same structure. Network 401 may be similar to network 201 discussed above. Wireless communication links 445 and 455 may provide communication with the access node 410 over one or more RATs. The wireless devices may operate in NB-IoT mode or Cat M1 mode enabling the wireless devices to communicate with access node 410 over a relatively narrow bandwidth.

Figure 5:
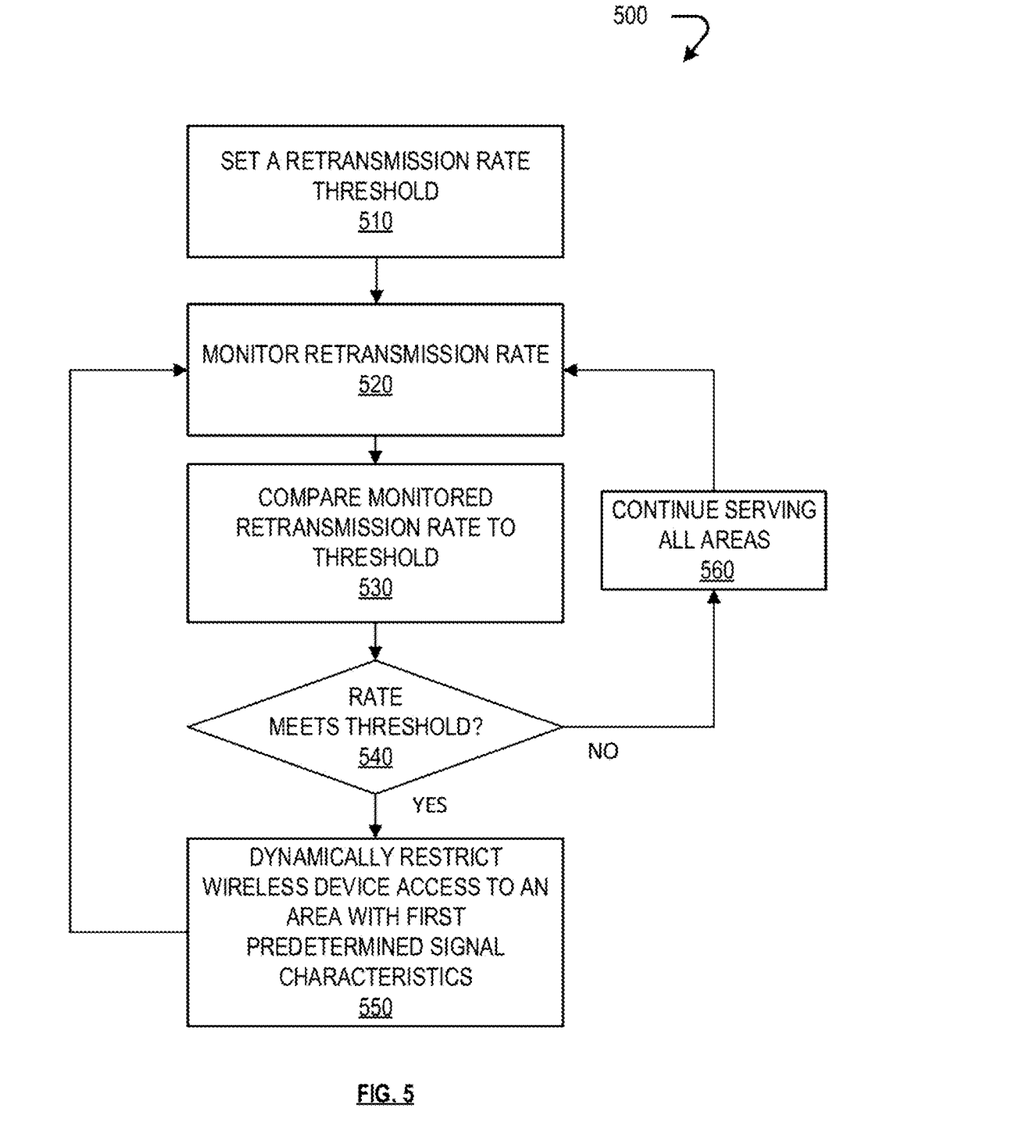
FIG. 5 depicts an exemplary method for managing coverage access in accordance with disclosed embodiments.

Further, instructions stored on memory 412 can include instructions for dynamically restricting wireless device access to a predefined area which will be further explained below with reference to FIGS. 5-7. The instructions may facilitate setting definition of a retransmission rate threshold, monitoring retransmission rates within the network, and restriction of wireless device access from one or more predefined areas based on the comparison of the retransmission rate threshold to the monitored retransmission rate. If the monitored rate meets the predetermined threshold, the instructions may dictate dynamically restricting additional wireless devices from connecting to the access node in one or more of the predefined areas.

The disclosed methods for dynamically managing coverage access based on a comparison of a monitored retransmission rate with a retransmission rate threshold are further discussed with reference to FIGS. 5-7. FIG. 5 illustrates an exemplary method 500 for dynamically restricting wireless devices from accessing a predefined area when the monitored retransmission rate meets the retransmission rate threshold. The method may occur in dynamically in real time or at predetermined intervals. Method 500 may be performed by any suitable processor discussed herein, for example, a processor included in access node or base stations 110, 120, 210, 220, or processor 411 included in access node 410, or a processor included in controller node 204. For discussion purposes, as an example, method 500 is described as being performed by a processor included in access node 410.

Method 500 starts in step 510 when the access node 410 sets a retransmission rate threshold. The retransmission rate threshold may be determined based on network characteristics. If a target retransmission rate for the network is around 10%, the retransmission rate threshold will be set at a higher value, such as for example between 30% and 60%.

In step 520, the access node 410 monitors a retransmission rate within the network. In embodiments set forth herein, the monitored retransmission rate may correspond to a retransmission rate for a sector. Alternatively, the retransmission rate could be measured for a portion of a sector or for multiple sectors. The retransmission rate may be measured using BLER or the ratio of the number of erroneous blocks to the total number of received blocks. The calculation is based on a cyclic redundancy check (CRC) evaluation which is used for inspection of transport blocks at the receiver side. The CRC is attached to each transport block upon sending by the transmitter and at the destination the transport block is cross checked by the receiver. The transport block is successfully decoded if the attached CRC matches the CRC calculated by the receiver. The particulars of the testing, such as the number of blocks to test, may be determined based on network parameters. Instead of testing a specified number of blocks, the time for measurement could be predetermined in the network. The time for measurement will increase linearly with the number of blocks to test and thus either parameter may be specified. Testing provides results including the ratio of incorrectly received blocks to the total blocks sent to the UE, expressed as a percentage (%). Testing may also record a block error count, which is the number of incorrectly received blocks.

In step 530, the access node 410 compares the monitored retransmission rate to the retransmission rate threshold. For example, if the monitored retransmission rate is 20% and the retransmission rate threshold is 45%, then in step 540, the access node determines that the monitored retransmission rate does not meet the retransmission rate threshold and the access node 410 continues serving all areas of the sector in step 560. Alternatively, if the monitored retransmission rate is 60% in step 520, when the access node 410 compares the monitored retransmission rate of 60% to the 45% threshold, the access node 410 determines that the monitored retransmission rate meets the predetermined retransmission rate threshold in step 540.

Based on the determination in step 540, if the threshold is not met, the access node continues to serve wireless devices from all areas in step 560. Thus, as long as the threshold is not met, wireless devices requesting to connect from any location will be permitted to communicate with the access node. In step 520, the access node returns to monitoring. However, if the threshold is met in step 540, the access node dynamically restricts wireless device access to at least one predefined area with predetermined signal characteristics in step 550. For example, the access node may restrict wireless device access to an area with path loss in a predetermined range or above a predetermined value. Alternatively, the access node may dynamically restrict wireless device access to a predefined area having RSRP below a certain value. Combinations of RSRP and path loss values may also be utilized as the predetermined signal characteristics. Further, the access node may restrict wireless device access to CE level 2 when three CE levels (0, 1, and 2) are defined with respect to the access node.

In embodiments set forth herein, the dynamic restriction may apply only to devices sending connection requests. Thus, devices already connected to the access node continue receiving services and additional wireless devices in CE level 0 and CE level 1 will be able to connect to the access node 410. However, wireless devices in the restricted area, e.g., CE level 2 will not be able to connect upon sending a request unless monitored retransmission rate falls below the predetermined threshold in step 520. In some instances, when multiple NB-IoT UEs are near a cell edge in a high CE level, the access node ends up using a large portion of resources and an increased retransmission rate to serve these UEs while rejecting NB-IoT devices that are closer to the access node with good signal conditions and configured for a lower CE level. These scenarios are predominant for NB-IoT use cases due to the fact that cell bandwidth in NB-IoT is narrow, i.e. limited to 200 kHz, but can also occur with Cat-M1. Thus, in these circumstances, restricting wireless device access in certain areas can improve overall QoS and network performance.

Figure 6:
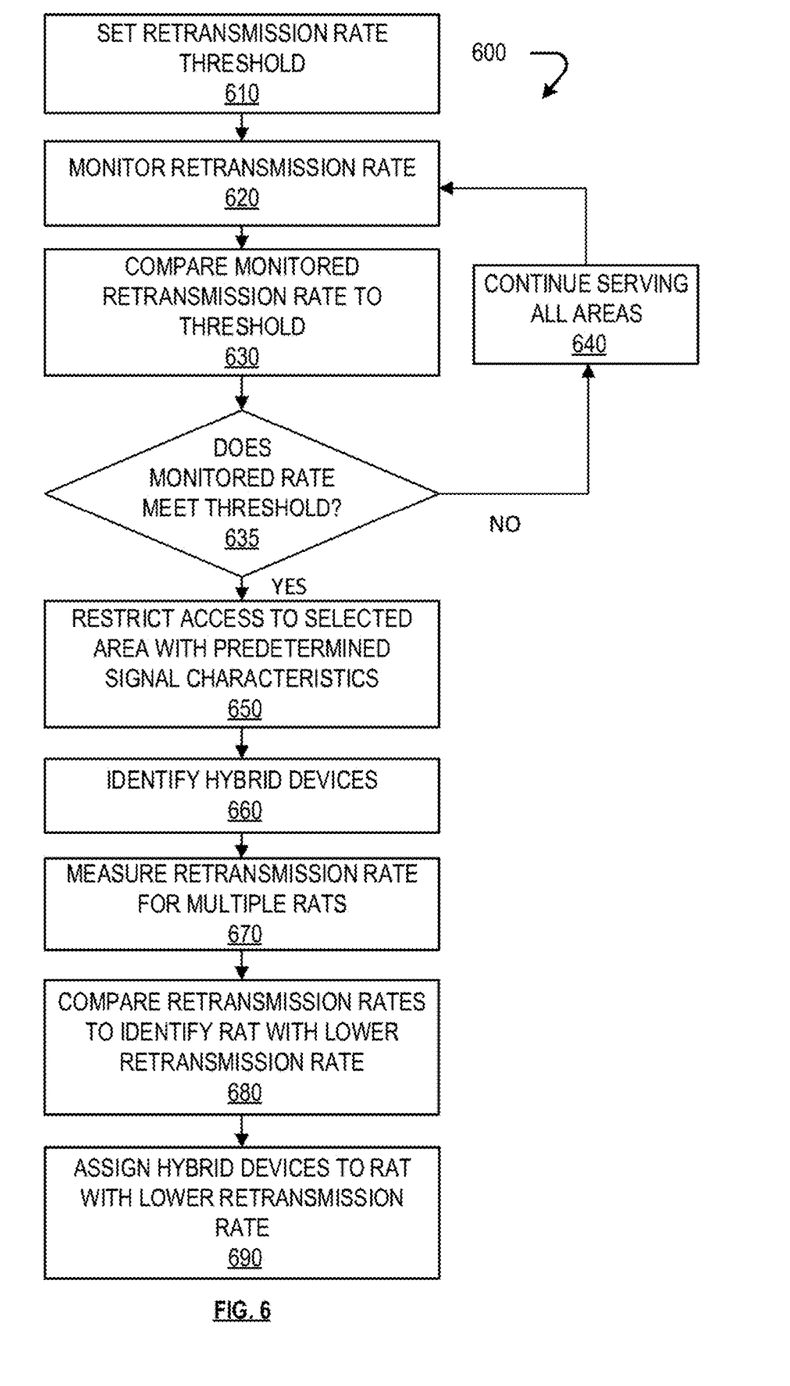
FIG. 6 depicts another exemplary method for managing coverage access in accordance with disclosed embodiments.

The method of FIG. 6 illustrates a further method 600 for dynamically managing coverage access by restricting wireless device access to a predefined region based on signal characteristics of the region. Method 600 may be performed by any suitable processor discussed herein, for example, a processor included in access node or base stations 110, 120, 210, 220 or processor 411 included in access node 410, or a processor included in controller node 204. For discussion purposes, as an example, method 600 is described as being performed by a processor included in access node 410.

In step 610, the access node 410 sets a retransmission rate threshold. The retransmission rate threshold may set relative to the target retransmission rate in the network. Thus, the threshold may be set, for example, to 45%. The determination of the threshold may be made at the access node 410.

In step 620, the access node 410 monitors the retransmission rate within a sector. The retransmission rate may be calculated as the BLER discussed above with respect to FIG. 5. In step 630, the access node 410 compares the monitored retransmission rate to the retransmission rate threshold as explained above with respect to FIG. 5. If the monitored retransmission rate does not meet the threshold in step 635, the access node 410 continues serving all areas in step 640. In other words, the access node 410 allows all requesting devices to connect, regardless of their location. The access node 410 then continues monitoring the retransmission rate in step 620.

However, if the monitored retransmission rate meets the threshold in step 635, the access node 410 restricts access to a selected area or region having first signal characteristics in step 650. As set forth above with respect to FIG. 5, the signal characteristics may be related to path loss and/or low RSRP. For example, the restricted region has a higher path loss and or lower RSRP than other regions. The restricted region may also correspond to a CE level, for example, CE level 2. In operation, the access node 410 may receive a connection request from a UE, determine that the UE is in a restricted area and refuse to allow connection based on this determination.

After determining that the monitored retransmission rate meets the retransmission rate threshold in step 635 and restricting access for requesting UEs in step 650, the access node 410 identifies hybrid or dual capable devices in step 660. The identified devices may be capable of using multiple RATs. For example, the hybrid devices may be capable of utilizing both Cat-M1 and NB-IoT technologies. The hybrid devices may, for example, be identified individually upon sending of a connection request to the access node 410.

In step 670, the access node 410 monitors retransmission rates for the two RATs. For example, the access node 410 determines retransmission rates within the sector for Cat-M1 and NB-IoT RATs. In step 680, the access node 410 compares the retransmission rates for the two RATs. For example, the access node 410 may compare the retransmission rate in the sector over a set time period for Cat-M1 with the retransmission rate in the sector over the same time period for NB-IoT. Through this comparison, the access node 410 identifies the RAT with the lower retransmission rate.

In step 690, the access node 410 assigns the hybrid devices to the RAT with the lower retransmission rate. Thus, the access node 410 may continue to serve devices that are already connected from all regions, it may assign hybrid devices that are connected using one RAT to another RAT. Further, as set forth above with respect to step 650, the access node may disallow additional devices attempting to connect from a preselected area having predetermined signal characteristics. By managing coverage access in this manner, the access node 410 may improve network performance for connected devices.

Figure 7:
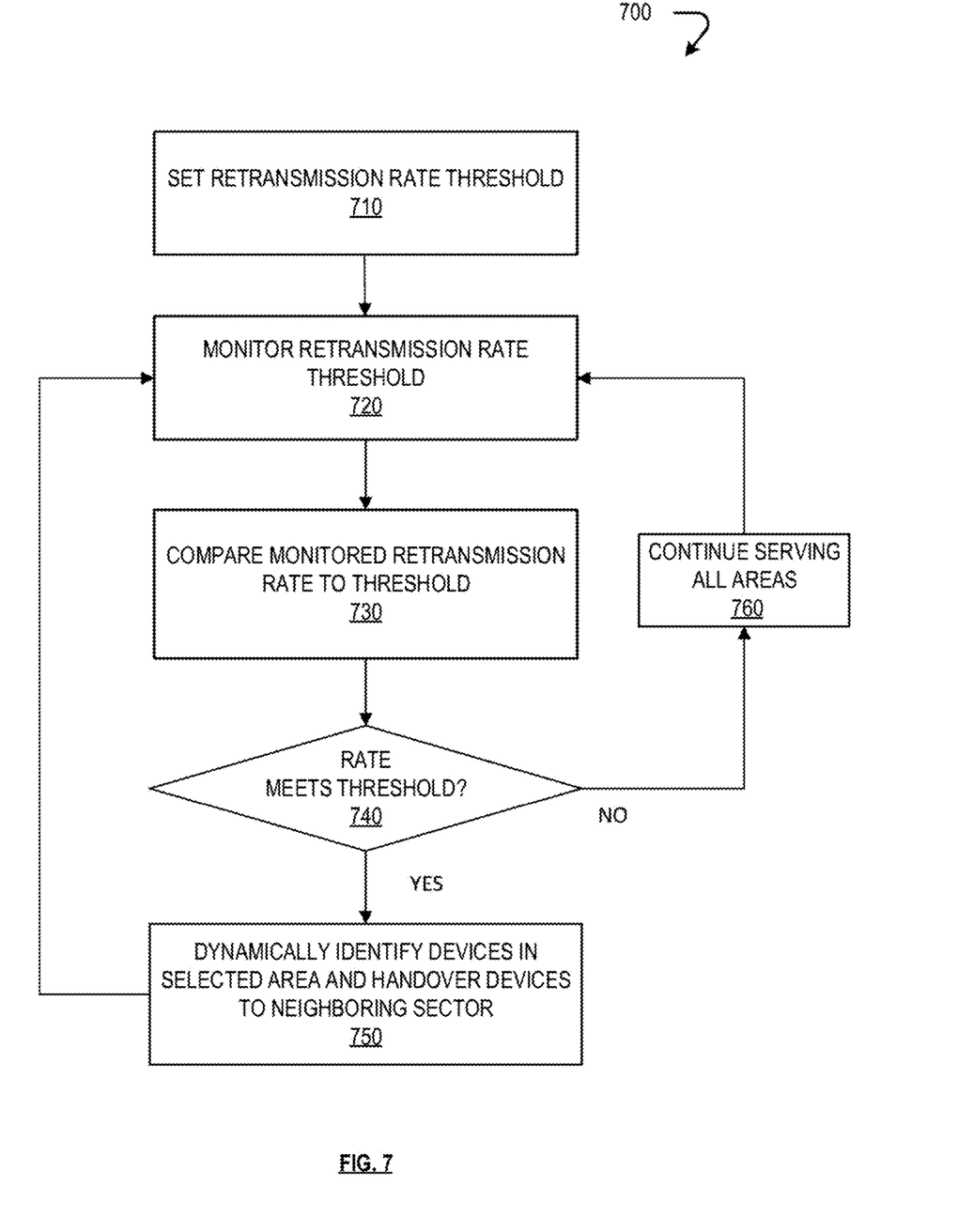
FIG. 7 depicts another exemplary method for managing coverage access in accordance with disclosed embodiments.

FIG. 7 depicts another exemplary method 700 for managing coverage access in accordance with disclosed embodiments. Method 700 may be performed by any suitable processor discussed herein, for example, a processor included in access node 110, 120, 210, 220, or processor 411 included in access node 410, or a processor included in controller node 204. For discussion purposes, as an example, method 700 is described as being performed by a processor included in access node 410.

In the embodiment of FIG. 7, the access node 410 may set a retransmission threshold in step 710. In step 720, the access node 410 monitors a retransmission rate, for example, an aggregate retransmission rate or BLER in the sector. In step 730, the access node 410 compares the monitored retransmission rate from step 730 to the retransmission rate threshold from step 710. If the monitored retransmission rate does not meet the threshold in step 740, the access node 410 continues serving all areas in step 760 and allows all devices requesting connections from all of the areas to connect. The access node continues monitoring in step 720.

However, if the monitored retransmission rate meets the threshold in step 740, the access node 410 dynamically executes a handover of wireless devices in a selected area to a neighboring sector in step 750. The handover may be executed by sending a radio resource control (RRC) reconfiguration request to devices requesting to connect from the selected area. The method may return to monitoring in step 720. Thus, the access node 410 may hand devices requesting connections over to a neighboring access node when the devices are in a preselected area or region. The region may be characterized by predetermined signal characteristics, such as high path loss or low RSRP and may correspond to CE level 2. Further, the access node 410 may hand over connected devices in the preselected area to the neighboring access node. By managing coverage access in this manner, overall network performance parameters are improved.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize network resources, the methods disclosed may be performed for multiple access nodes and RATs.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
setting a retransmission rate threshold within a wireless network;
monitoring a retransmission rate within the wireless network;
comparing the monitored retransmission rate to the retransmission rate threshold; and
restricting wireless device access to at least one selected area within the wireless network when the monitored retransmission rate meets the retransmission rate threshold, wherein the at least one selected area is characterized by a corresponding range of signal performance parameters and the at least one selected area is characterized by higher pathloss than other network areas.

2. The method of claim 1, further comprising determining that a wireless device is a hybrid Internet of Things (IoT) wireless device configured to connect to both narrowband (NB)-IoT and Category (Cat)-M1 RATs.

3. The method of claim 2, further comprising separately measuring retransmission rates for Cat-M1 and NB-IoT RATs in the wireless network and comparing the Cat-M1 retransmission rate to the NB-IoT retransmission rate to identify a RAT having a lower retransmission rate.

4. The method of claim 3, further comprising assigning the hybrid IoT wireless device to the RAT having the lower retransmission rate.

5. The method of claim 1, further comprising assigning a wireless device to a neighboring cell when the wireless device is in the selected area and the monitored retransmission rate meets the retransmission rate threshold.

6. The method of claim 1, wherein the selected area corresponds to a highest coverage enhancement (CE) level.

7. The method of claim 6, further comprising allowing access to wireless devices in other areas corresponding to other CE levels.

8. The method of claim 6, wherein the wireless device is at least one of a narrowband NB-IoT device and Cat-M1 device.

9. The method of claim 1, wherein dynamically restricting the wireless device access includes preventing additional wireless devices from connecting to the selected area.

10. The method of claim 1, further comprising using a block error rate (BLER) as a measure of the retransmission rate.

11. A system comprising:
an access node including at least one processor programmed to perform steps including:
setting a retransmission rate threshold within a wireless network;
monitoring a retransmission rate within the wireless network;

comparing the monitored retransmission rate to the retransmission rate threshold; and restricting wireless device access to at least one selected area within the wireless network when the monitored retransmission rate meets the retransmission rate threshold; and assigning a first wireless device to a neighboring cell when the wireless device is in the selected area and the monitored retransmission rate meets the retransmission rate threshold.

12. The system of claim 11, wherein the at least one selected area is characterized by a corresponding range of signal performance parameters and the at least one selected area is characterized by higher pathloss than other network areas.

13. The system of claim 11, wherein the at least one processor further determines that a second wireless device is a hybrid IoT wireless device configured to connect to both NB-IoT and Cat-M1 RATs.

14. The system of claim 13, wherein the at least one processor further is programmed to perform the step of separately measuring retransmission rates for Cat-M1 and NB-IoT RATs in the wireless network and comparing the Cat-M1 retransmission rate to the NB-IoT retransmission rate to identify a RAT having a lower retransmission rate.

15. The system of claim 14, wherein the at least one processor is further programmed to assign the hybrid IoT wireless device to the RAT having the lower retransmission rate.

16. A method comprising:

setting a retransmission rate threshold within a wireless network;

monitoring a retransmission rate for the wireless network;

comparing the monitored retransmission rate to the retransmission rate threshold;

restricting wireless device access to at least one selected area within the wireless network when the monitored retransmission rate meets the retransmission rate threshold, wherein the at least one selected area is characterized by a corresponding range of signal performance parameters and the at least one selected area is characterized by higher pathloss than other network areas;

monitoring multiple retransmission rates for different RATs within the wireless network;

comparing the retransmission rates for the different RATs; and assigning wireless devices to a RAT with a lower retransmission rate.

17. The method of claim 16, wherein the method further comprises determining that the wireless devices are hybrid IoT wireless devices configured as both NB-IoT and Cat-M1 capable and can connect to either NB-IoT or Cat-M1 RATs.

18. The method of claim 16, further comprising measuring retransmission rates within the wireless network for Cat-M1 and NB-IoT RATs.

* * * * *